United States Patent
Migliaro, Jr. et al.

(10) Patent No.: US 8,650,854 B2
(45) Date of Patent: Feb. 18, 2014

(54) BIFURCATION AND AFT VENT USED TO VARY FAN NOZZLE EXIT AREA

(75) Inventors: Edward F. Migliaro, Jr., Marlborough, CT (US); Michael Winter, New Haven, CT (US); Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 1213 days.

(21) Appl. No.: 12/374,336

(22) PCT Filed: Oct. 12, 2006

(86) PCT No.: PCT/US2006/040257
§ 371 (c)(1),
(2), (4) Date: Jan. 19, 2009

(87) PCT Pub. No.: WO2008/045094
PCT Pub. Date: Apr. 17, 2008

(65) Prior Publication Data
US 2009/0178416 A1 Jul. 16, 2009

(51) Int. Cl.
*F02K 1/00* (2006.01)
(52) U.S. Cl.
USPC .................................. 60/226.1; 60/771
(58) Field of Classification Search
USPC .................. 60/226.1, 226.2, 226.3, 771
See application file for complete search history.

(56) References Cited

U.S. PATENT DOCUMENTS

| | | | |
|---|---|---|---|
| 3,800,530 A | 4/1974 | Nash | |
| 6,004,095 A | 12/1999 | Waitz et al. | |
| 6,820,410 B2 * | 11/2004 | Lair | 60/204 |
| 6,983,588 B2 * | 1/2006 | Lair | 60/226.1 |
| 7,607,308 B2 * | 10/2009 | Kraft et al. | 60/785 |
| 2003/0182925 A1 | 10/2003 | Lair | |

FOREIGN PATENT DOCUMENTS

| | | |
|---|---|---|
| EP | 0 469 825 | 2/1992 |
| EP | 1 795 708 | 6/2007 |
| GB | 2 183 296 | 6/1987 |
| GB | 2 407 142 | 4/2005 |

OTHER PUBLICATIONS

International Search Report for PCT Application No. PCT/US2006/040257, Nov. 28, 2007.

* cited by examiner

*Primary Examiner* — Ehud Gartenberg
*Assistant Examiner* — Vikansha Dwivedi
(74) *Attorney, Agent, or Firm* — Carlson, Gaskey & Olds, P.C.

(57) ABSTRACT

A turbofan engine includes a core nacelle housing a spool having a turbine. A turbofan is arranged upstream from the core nacelle and is coupled to the spool. A fan nacelle surrounds the turbofan and core nacelle. A bifurcation supports the core nacelle relative to the fan nacelle and extends radially between the nacelles. The core and fan nacelles provide a bypass flow path receiving bypass flow from the turbofan. In the example, the nacelles provide a fixed nozzle exit area. The bifurcation includes an inlet that is in communication with a passage. The passage is selectively opened and closed by a valve to provide air from the inlet to a vent opening near the nozzle exit area. By opening the valve, the nozzle exit area is effectively increased to provide increased bypass flow through the turbine engine.

13 Claims, 3 Drawing Sheets

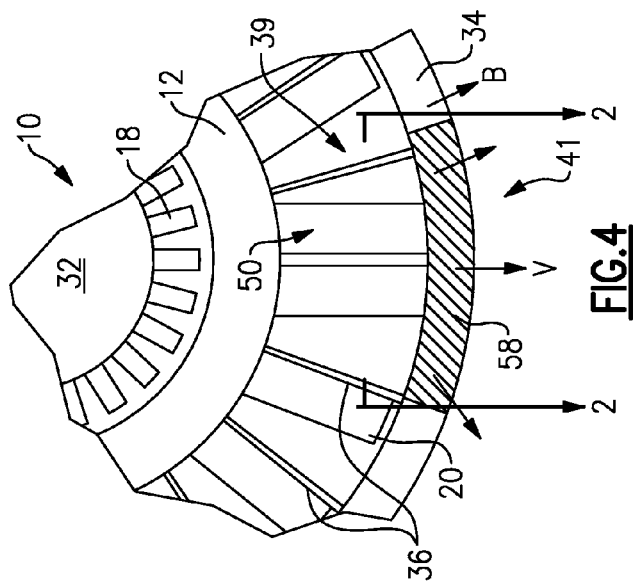
FIG.4
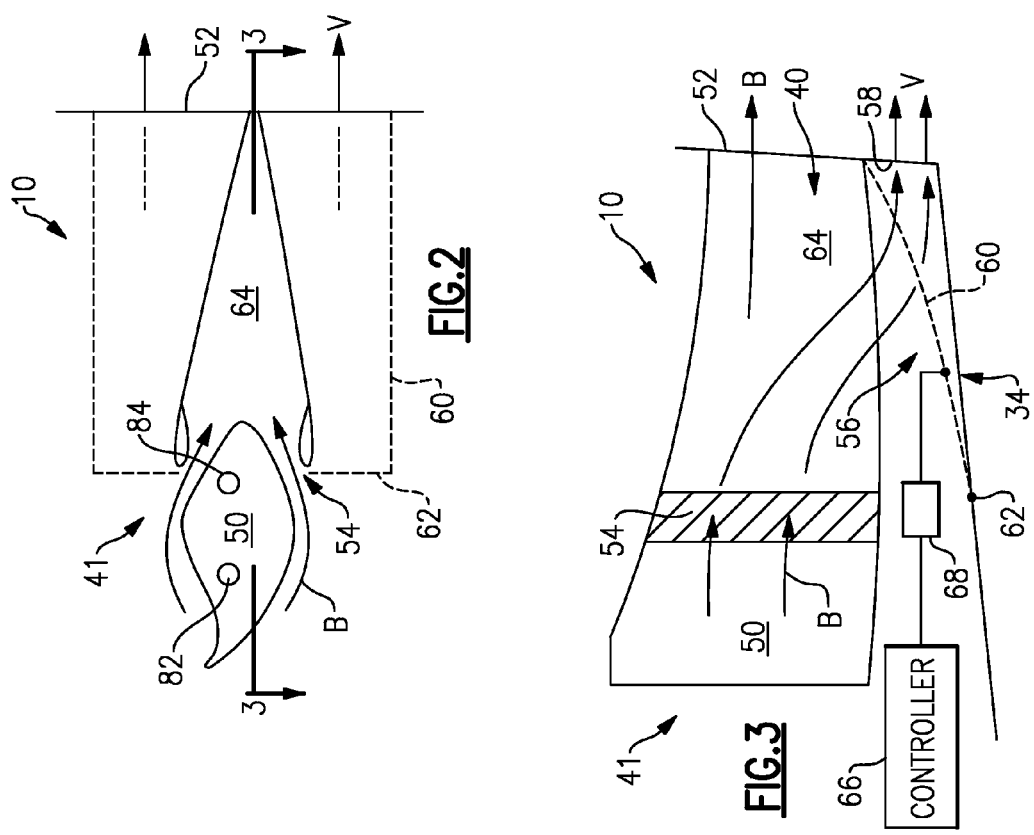
FIG.2
FIG.3

BIFURCATION AND AFT VENT USED TO VARY FAN NOZZLE EXIT AREA

BACKGROUND OF THE INVENTION

This invention relates to an apparatus and method for changing the effective nozzle exit area of a turbofan engine.

A turbofan engine includes a core nacelle housing one or more spools that support at least one compressor and turbine section. One of the spools is used to rotationally drive a turbofan arranged upstream from the core nacelle. A fan nacelle surrounds the turbofan and the core nacelle. The core nacelle is supported by several bifurcations to centrally locate the core nacelle relative to the fan nacelle. In addition to supporting the core nacelle, the bifurcations are used to house various components, such as bleed air conduits and wires, for example. The bifurcations are typically fixed, closed structures.

A generally annular bypass flow path is arranged between the core and fan nacelles through which bypass air from the turbofan flows. The bifurcations are arranged in the bypass flow path. The bypass flow exits from a nozzle exit area at the rear of the engine. The nozzle exit area is typically fixed in a turbofan engine.

It may be desirable in some applications to change the nozzle exit area to control the engine's efficiency and operation. In some military engines, the nozzle exit area is changed by manipulating flaps around its outer perimeter to vary the physical area of the nozzle. Features used to adjust the physical nozzle exit area add significant weight and cost to the turbofan engine, which is particularly undesirable in commercial applications.

What is needed is an apparatus and method to change the effective nozzle exit area while taking advantage of the turbofan engine's existing structure to avoid additional cost and weight.

SUMMARY OF THE INVENTION

A turbofan engine includes a core nacelle housing a spool having a turbine. A turbofan is arranged upstream from the core nacelle and is coupled to the spool. A fan nacelle surrounds the turbofan and core nacelle. A bifurcation supports the core nacelle relative to the fan nacelle and extends radially between the nacelles. The core and fan nacelles provide a bypass flow path receiving bypass flow from the turbofan. In the example, the nacelles provide a fixed nozzle exit area.

In one example, the bifurcation includes an inlet that is in communication with a passage. The passage is selectively opened and closed by a valve to provide air from the inlet to a vent opening near the nozzle exit area, in one example. By opening the valve, the nozzle exit area is effectively increased to provide increased bypass flow through the turbine engine.

These and other features of the present invention can be best understood from the following specification and drawings, the following of which is a brief description.

BRIEF DESCRIPTION OF THE DRAWINGS

FIG. 2 is a cross-sectional view of a bifurcation used to support a core nacelle relative to a fan nacelle taken along line 2-2 in FIG. 4.

FIG. 3 is a side elevational view of the bifurcation taken along line 3-3 in FIG. 2.

FIG. 4 is an aft view of the turbofan engine shown in FIG. 1.

DETAILED DESCRIPTION OF THE PREFERRED EMBODIMENT

Figure 1:
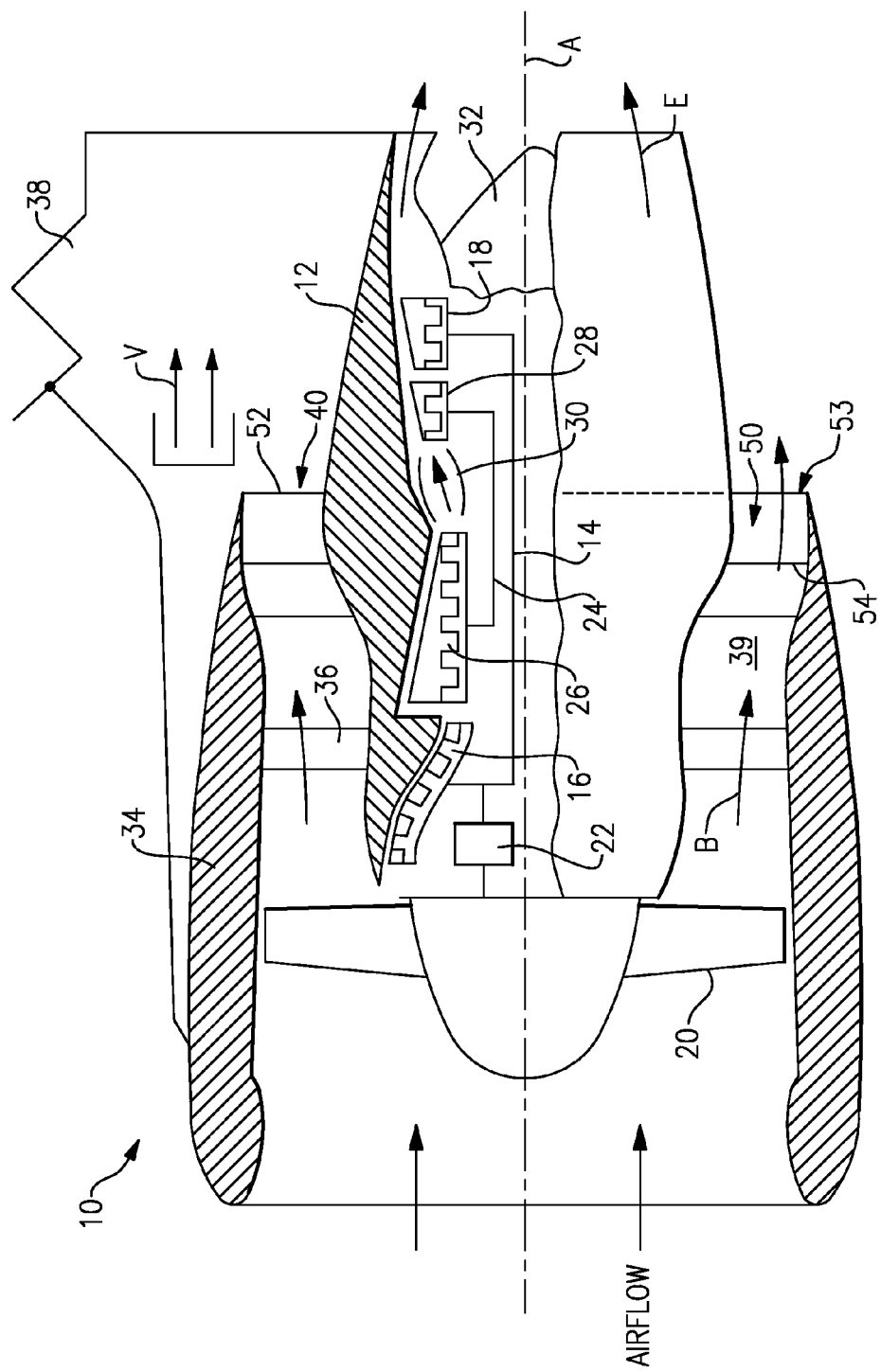
FIG. 1 is a cross-sectional view of an example geared turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40. In the example shown in the Figures, fixed, aft perimeters of the core and fan nacelles 12, 34 provide a fixed nozzle 53.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 (FIG. 3) that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8M and 35,000 feet. The turbofan 20 is designed at a particular fixed stagger angle for an efficient cruise condition. The flow control device 41 is operated to effectively vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal position for the nozzle exit area 40 at cruise and climb conditions, and opens relative thereto to define a position for other flight conditions. The flow control device 41 provides an approximately 20% change in the exit nozzle area 40, in one example.

The core nacelle 12 is supported relative to the fan nacelle 34 by one or more bifurcations 50, typically two or three. The bifurcations 50 extend radially between the core and fan nacelles 12, 34. Typically, the bifurcations 50 are fixed structures that enclose components such as bleed air conduits 82 and wires 84, for example. In the example embodiments, one of the bifurcations 50 is used to communicate bypass flow with the flow control device 41, which includes a vent opening 58 arranged at the aft 52 of the turbine engine 10 to effectively increase the nozzle exit area 40 by providing an additional, secondary flow path.

Referring to FIGS. 2-5, bypass flow B flows around the bifurcation 50 and enters inlets 54 that are in communication with a cavity 64 within the bifurcation 50, shown in FIG. 2. In one example shown in FIG. 2-4, the cavity 64 fluidly communicates with a passage 56 provided within the fan nacelle 34. The vent opening 58 is arranged on an exterior surface of the fan nacelle 34 at the aft of the turbine engine 10, which is best shown in FIG. 4. A valve 60 is arranged in the passage 56 to control the bypass flow through the passage 56 and out the vent opening 58.

The valve 60 is schematically shown moveable about a pivot 62 between closed and open positions in response to manipulation by an actuator 68, which is shown in FIG. 3. The closed position is indicated by dashed lines in FIG. 3. The valve 60 is opened to provide an additional vent flow V to increase the flow through the bypass flow path 39, which is shown in FIG. 4. The vent flow V is bypass flow B that has been diverted from the bypass flow path 39 and which otherwise would have exited the nozzle. Opening the valve 60 effectively increases the nozzle exit area, which decreases the pressure downstream from the turbofan 20.

A controller 66 commands the actuator 68 in response to predetermined conditions to improve the efficiency and/or alter the operation of the turbofan engine 10. In this manner, the example arrangement takes advantage of existing structure used in a typical turbofan engine 10, such as the bifurcation 50 and fan nacelle 34, and adds a minimal number of components so that additional weight and cost is minimized.

Figure 5:
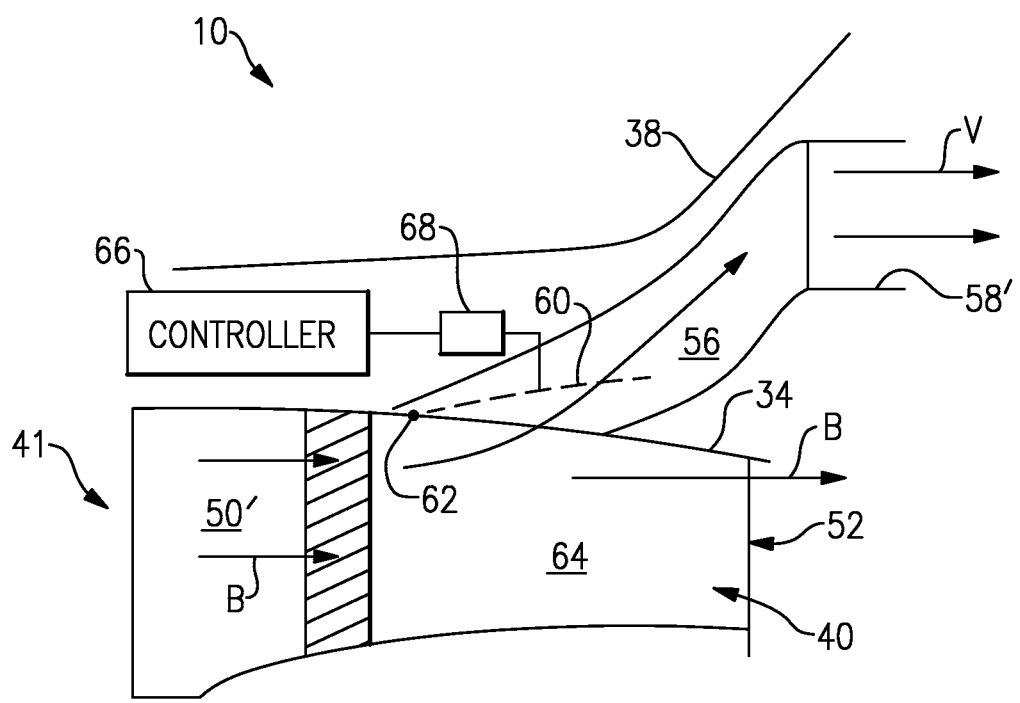
FIG. 5 is an enlarged side elevational view of the example embodiment shown in FIG. 1.

In another example shown in FIG. 5, the upper bifurcation 50' is used to communicate the vent flow V to a vent opening 58' in the pylon 38, which is also shown in FIG. 1.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine comprising:
   a core nacelle housing a spool supporting a turbine;
   a fan nacelle and the core nacelle providing a nozzle which includes a nozzle exit area, the nozzle fully within an annulus arranged radially between the core and fan nacelles and that provides a bypass flow path;
   a turbofan surrounded by the fan nacelle and coupled to the spool and arranged upstream from the core nacelle, the turbofan adapted to produce a bypass flow through the bypass flow path that is exhausted through the nozzle;
   a passage selectively in fluid communication with the bypass flow path for exhausting a portion of the bypass flow through the passage instead of the nozzle to a vent that is located in the pylon and outside the annulus to change an effective nozzle exit area; and
   a bifurcation arranged in the bypass flow path and supporting the core nacelle relative to the fan nacelle, the bifurcation including an inlet for selectively providing the portion of bypass flow to the passage.

2. The turbofan engine according to claim 1, comprising a valve moving between closed and open positions for selectively fluidly connecting the inlet and the passage.

3. The turbofan engine according to claim 2, wherein the open position exhausts the portion of bypass flow from the engine.

4. The turbofan engine according to claim 2, comprising a controller programmed to manipulate the valve between the open and closed positions in response to predetermined conditions.

5. The turbofan engine according to claim 4, comprising an actuator manipulating the valve between the open and closed positions in response to a command from the controller corresponding to the predetermined conditions.

6. The turbofan engine according to claim 1, wherein the vent opening is provided on and extending through an exterior circumferential surface thereof, the portion of bypass flow exiting the vent opening.

7. The turbofan engine according to claim 1, wherein the nozzle exit area is fixed.

8. The turbofan engine according to claim 1, wherein at least one of bleed air conduits and wires are arranged within the bifurcation.

9. The turbofan engine according to claim 1, wherein the annulus is a 360° circumferential region bounded by an outermost circumferential surface of the core nacelle and an innermost circumferential surface of the fan nacelle.

10. A method of changing an effective nozzle exit area of a turbofan engine comprising the steps of:
   a) providing bypass flow through a 360° engine nozzle provided radially between core and fan nacelles and having a nozzle exit area;
   b) supporting the core nacelle with a bifurcation;
   c) selectively communicating a portion of the bypass flow through a passage instead of the engine nozzle for changing an effective nozzle exit area of the turbine engine, including diverting the portion of bypass flow through the bifurcation;
   d) exhausting the portion of the bypass flow through a vent opening in a pylon.

11. The method according to claim 10, wherein step b) includes exhausting the portion of bypass flow through a vent opening in a fan nacelle.

12. The method according to claim 10, wherein step b) includes moving a valve between open and closed positions.

13. The method according to claim 10, wherein step b) includes changing the effective nozzle exit area in response to a predetermined condition.

\* \* \* \* \*